Oct. 3, 1967  E. NOVOSAD  3,345,077
SEALING WASHER FOR ROTARY MECHANICAL SEAL
Filed July 15, 1965
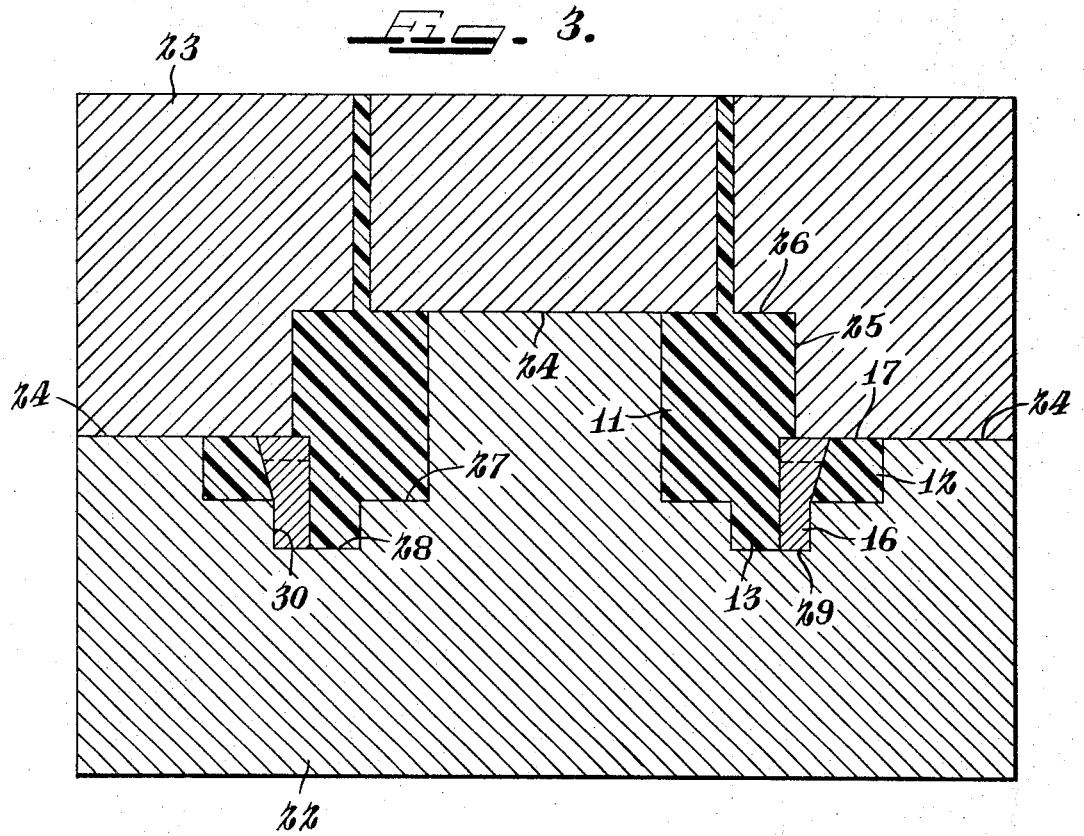
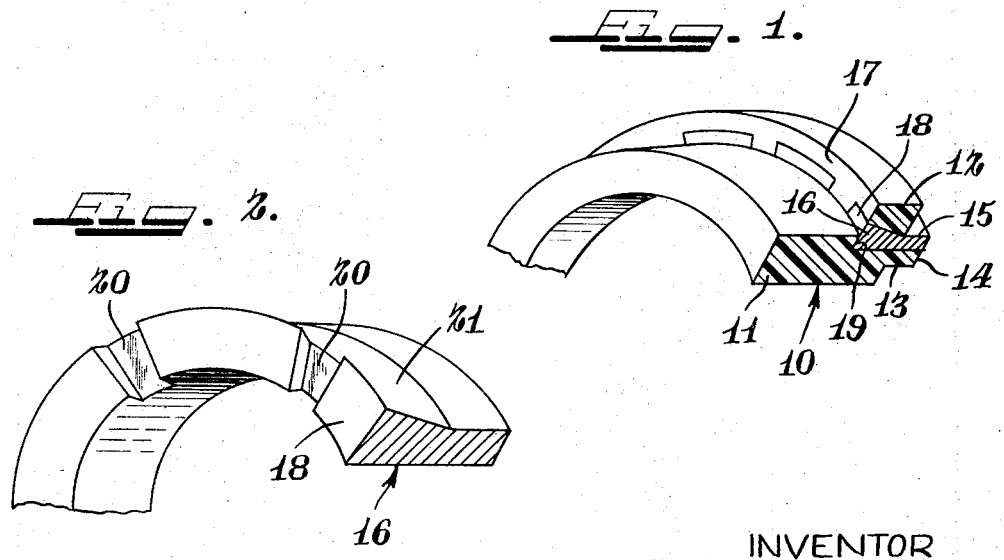
INVENTOR
EUGENE NOVOSAD
BY
Charles F. Voytech
Atty.

United States Patent Office 3,345,077
Patented Oct. 3, 1967

3,345,077
SEALING WASHER FOR ROTARY MECHANICAL
SEAL
Eugene Novosad, Chicago, Ill., assignor to Crane Packing
Company, Morton Grove, Ill., a corporation of Illinois
Filed July 15, 1965, Ser. No. 472,109
5 Claims. (Cl. 277—96)

This invention relates to sealing washers for rotary mechanical seals.

Rotary mechanical seals as used in water pumps, for example, are comprised essentially of two relatively rotatable sealing washers each of which is sealed with respect to one of two relatively rotatable machine elements such as a shaft and a housing through which the shaft extends. The sealing washers are provided with radially disposed lapped surfaces which abut against one another and which provide a running fluid-tight seal between the washers. One of said washers, usually termed the "seat" for the seal is made of a hard material such as metal or ceramic, and the other washer is made of a phenolic substance preferably containing metallic particles for better heat transmission and smoother running. The ring made of the phenolic substance is softer than the seat ring, and when exposed to the fluid being sealed, is subject to the influence of impurities therein which may be highly abrasive. These particles attack and erode the sharp corner of the phenolic washer defined by the intersection of the radially disposed sealing face and the cylindrical surface thereon, thereby making it possible for other particles to enter between the faces and produce an accelerated deteriorating condition in the phenolic washer.

It has been proposed to protect the phenolic washer against such erosion by foreign substances by surrounding the exposed corner of the washer with a metal ring which has a radially disposed surface constituting an extension of the radially disposed surface on the phenolic washer. Such metal ring, if it is applied to the metal washer subsequent to the formation thereof makes necessary an extra assembly operation and hence it has been further proposed to unite the metal ring with the phenolic washer during the molding of the latter. Such simultaneous uniting of the metal ring with the washer during the molding operation, however, has presented problems of aligning the radially disposed surfaces on the metal and phenolic rings. The plastic condition of the phenolic during the molding operation tends to cause the metal ring to float axially toward the rear of the phenolic washer away from the radially disposed face thereof. It is impractical to mold the phenolic ring with the radially disposed surface thereof uppermost since that tends to cause the impurities in the phenolic substance to float to the radially disposed surface which is undesirable. Furthermore, the sprue holes in the mold for the phenolic, if introduced at the face of the washer would leave a fractured surface thereat which would be difficult to remove during the subsequent lapping procedure necessary to produce a smooth running face on the washer, without the expenditure of an undue amount of time for this operation.

It is, accordingly, an object of this invention to provide a sealing washer for a rotary mechanical seal wherein the washer is provided with a metal ring so formed as to have its radial face accurately aligned with the radial sealing face of the phenolic washer during the molding of the latter.

Another object of this invention is the provision of a sealing washer of phenolic composition for a rotary mechanical seal wherein the washer has embedded therein a metallic ring having a radially disposed sealing surface which is accurately aligned with the radially disposed sealing surface of the finished washer, and wherein said insert is mechanically locked in the phenolic.

This invention also has within its purview the provision of a method of predetermining the location of a metal insert in a phenolic washer during the molding of the latter.

These and other objects of this invention will become apparent from the following detailed description when taken together with the accompanying drawings in which FIG. 1 is a fragmentary perspective view of a washer made in accordance with this invention;

FIG. 2 is an enlarged fragmentary perspective view of the metal insert for the washer of FIG. 1; and FIG. 3 is a cross-section through a mold showing how the insert is disposed in the mold during the formation of the washer.

In general terms, the solution, according to this invention, of the problem of accurately locating the metal protective ring in a phenolic washer comprises forming said ring with reference to the phenolic washer in such fashion that said ring or portions thereof extend axially entirely across some portion of the phenolic washer, so that said ring may be directly contacted at its ends by the upper and lower halves of the mold. This contact of the metal ring by the upper and lower halves of the mold firmly holds the ring in place in the mold during the molding of the remainder of the washer and prevents any shifting of the ring in the mold during such molding operation. In addition to providing a means for locating and holding the ring axially in the mold, said ring is also located radially in the mold by direct contact between an outer surface of the ring and the mold. Thus, movement of the ring in any direction is completely eliminated and the location of the ring in the mold is precisely determined and predictable.

Referring now to FIG. 1, wherein the embodiment chosen to illustrate this invention is shown, the sealing washer 10 has a main body 11 of substantially rectangular radial cross-section at one end of which is a radially outwardly extending flange 12 and an axially extending flange or nose 13. A radially disposed surface 14 on nose 13 is lapped perfectly flat and smooth and constitutes one of the running sealing surfaces of the rotary mechanical seal of which washer 10 is a part.

Washer 10 is molded from a phenolic material in which are interspersed powdered tin and zinc to provide better heat conduction through the material and better wear characteristics for the sealing surface 14. Flange 12 functions as an abutment against which a flexible sealing element (not shown) is clamped. The outer cylindrical surface 15 of washer 10 is exposed to the fluid to be sealed which, as an example, might be water pumped through the apparatus in which washer 10 is installed. Such fluid may contain abrasive particles of sand, rust particles from intake pipes and possibly metallic particles from the pump walls, or the like. Such abrasive particles tend to wear said outer cylindrical surface, particularly at the corner defined by said cylindrical surface 15 and the radially disposed surface 14. In prior designs the entire nose 13 was made of the phenolic material which was, of course, brittle and the sharp corner was therefore fragile and readily fractured by such abrasive particles. Just as soon as a fragment of the corner was broken off by an abrasive particle, a wider opening was provided for the entry of larger abrasive particles which in turn caused an erosion of additional portions of the corner and adjoining face, until the surface 14 was completely destroyed.

In the present invention the outer cylindrical surface 15 is formed on the protruding portion of a metal ring 16 which is shown on an enlarged scale in FIG. 2. Said ring 16 may be made of brass or other non-corrodible material and is made of an axial length equal to the axial distance from radially disposed surface 14 to the back radial surface 17 of flange 12. In other words, the axial dimension of metal ring 16 is equal to the axial dimension of nose 13 plus the axial dimension of flange 12. The radial dimension of ring 16 is chosen to be sufficient to render the ring rigid under ordinary handling conditions. In the form chosen to illustrate this invention, however, said radial thickness of ring 16 is such that its internal diameter is less than the external diameter of the main body 11 of the washer 10. Thus, as shown in FIG. 1, the rear radial surface 18 of metal ring 16 abuts against a shoulder 19, so that shoulder 19 takes any axial thrust which might be imposed upon ring 16.

Ring 16 is tapered outwardly over that portion which is within the radially outwardly extending flange 12, to increase the area of the surface 18 exposed at the back radial surface 17 of flange 12. Radially extending slots 20 are formed in the back or rear radial surface 18 of ring 16 of an axial dimension which is slightly less than half the thickness of the flange 12. Slots 20 thus provide a means for connecting the flange 12 to the main body 11 of the sealing washer 10. The tapered surface 21 provides a lock for metal ring 16 in flange 12 against movement of said ring in the direction of the nose 13.

The method of molding washer 10 with the metal ring 16 embedded therein, according to FIG. 1, may be described with reference to FIG. 3. In said figure the mold is comprised of a lower half 22 and an upper half 23 with a parting line 24 therebetween. Said parting line forms the back radial surface 17 of flange 12, the outer cylindrical surface 25 and back radial surface 26 of the main body 11 of the sealing washer, and extends across the slots 20 to form that portion of the back radial surface 17 at the slots.

The lower half 22 contains an annular recess 27 which forms the remainder of the main body 11, and flange 12, and an annular groove 28 which forms the nose 13. Ring 16 is placed in groove 28 in the manner shown by which the lowered face 29 thereof rests upon the bottom of groove 28 and the outer cylindrical surface 15 thereof fits snugly into the outer wall 30 of groove 28. The rear radial surface 18 of ring 16, being coplanar with the back radial surface 17 of flange 12, is contacted by the upper half 23 of the mold so that during the molding process, when the thermosetting material in plastic form is injected into the mold, ring 16 is rigidly held in place by the upper mold half 23 against axial movement relative to the main body portion 11, and is held against radial movement in the mold cavity, by the outer wall 30 of groove 28. Thus the movement of the thermo-setting material in plastic form into the mold cavity and across the slots 20 to form the radially extending flange 12 cannot effect a shift of the ring 16 from its desired position. Accordingly, the finished sealing washer 10 will uniformly be found to have the forward face 29 of ring 16 coplanar with the radially disposed surface 14 on the nose 13, and hence a minimum amount of lapping or other finishing is required to produce a satisfactory sealing surface on nose 13.

Axial pressure on ring 16 during subsequent handling will not have the effect of snapping off flange 12 inasmuch as such pressure will be taken by the shoulder 19 and not by the material in the slots 20. Said slots assist in aborbing any torque that might be exerted on ring 16 tending to break it loose from the main body portion 11 and the tapered surface 21 on ring 16 provides a mechanical interlock between the flange 12 and the ring tending to resist axial movement of the ring 16 away from body portion 11.

Although the invention has been described with reference to a rigid ring 16 made of metal and a molded washer made of phenolic material, it is understood that other hard materials and other moldable materials may be used without departing from the spirit of the invention. It is understood further that the shape of washer 10 may also be changed and that ring 16 may be correspondingly altered to adapt the washer to seal fluids introduced interiorly of nose 13 rather than exteriorly thereof as shown herein. The scope of this invention therefore is not to be limited to the foregoing illustrative embodiment, but is to be determined by the appended claims.

I claim:

1. A sealing washer for a mechanical seal or the like, said washer comprising a main annular body of synthetic plastic material moldable under heat and pressure, a flange extending radially from the main body, an axially extending annular nose at one end of the main body, and a ring of a metallic material which remains hard under such heat and pressure forming a part of said nose, said ring extending through said flange and having radially disposed surfaces exposed to the exterior of the washer at both axial ends of said ring, said ring forming the radially outer part of said nose, and said nose having a radially disposed surface thereon which is co-planar with one of the radially disposed surfaces on the said ring.

2. A sealing washer as described in claim 1, the said flange being disposed immediately axially adjacent said nose, and said ring extending axially through said nose and said flange.

3. A sealing washer as described in claim 1, said ring having radial slots therein in that portion of said ring which passes through the flange to provide connections of the said moldable material between the main body of the washer and said flange.

4. A sealing washer as described in claim 1, said ring extending axially through said flange and radially beyond the main annular body of the washer.

5. A sealing washer as described in claim 1, said ring comprising the radially outer portion of the nose of said washer and extending axially through said flange, said ring having a progressively larger diameter from the nose through said flange, the maximum diameter of said ring being greater than the maximum diameter of the main annular body of the washer to expose a radial surface on the said ring.

References Cited

UNITED STATES PATENTS 2,425,209    8/1947    Snyder et al. _____ 277—96
3,122,375    2/1964    Greenwald _____ 277—88

SAMUEL ROTHBERG, *Primary Examiner.*